US005381166A

United States Patent [19]

Lam et al.

[11] Patent Number: 5,381,166

[45] Date of Patent: Jan. 10, 1995

[54] INK DOT SIZE CONTROL FOR INK TRANSFER PRINTING

[75] Inventors: Si-Ty Lam, Pleasanton; An-Chung R. Lin, Cupertino; Young-Soo You, Los Altos, all of Calif.

[73] Assignee: Hewlett-Packard Company, Palo Alto, Calif.

[21] Appl. No.: 983,010

[22] Filed: Nov. 30, 1992

[51] Int. Cl.[6] ........................ B41J 2/005; G01D 15/16

[52] U.S. Cl. .................................................. 346/140.1

[58] Field of Search ...................... 346/1.1, 140 R, 75, 346/140.1

[56] References Cited

U.S. PATENT DOCUMENTS

| | | | |
|---|---|---|---|
| 3,790,703 | 2/1974 | Carley | 346/140 X |
| 4,164,745 | 8/1979 | Cielo et al. | 346/140 |
| 4,263,601 | 4/1981 | Nishimura | 346/140 X |
| 4,275,290 | 6/1981 | Cielo et al. | 219/216 |
| 4,387,382 | 6/1983 | Kohashi | 346/140 |
| 4,420,764 | 12/1983 | Okada | 346/140 |
| 4,422,082 | 12/1983 | Louzil | 346/75 |
| 4,561,789 | 12/1985 | Saito | 400/120 |
| 4,608,577 | 8/1986 | Hori | 346/140 |
| 4,675,694 | 6/1987 | Bupara | 346/1.1 |
| 4,751,532 | 6/1988 | Fujimura | 346/140 |

FOREIGN PATENT DOCUMENTS

| | | | |
|---|---|---|---|
| 184852 | 9/1985 | Japan | B41J 3/04 |
| 92-196236 | 4/1992 | Japan . | |

OTHER PUBLICATIONS

Robert C. Durbeck et al., "Output Hardcopy Devices", Academic Press, Inc., 1988, pp. 348-349.

*Primary Examiner*—Joseph W. Hartary
*Attorney, Agent, or Firm*—C. Douglass Thomas

[57] ABSTRACT

An ink transfer printing device having improved ink dot size control. The ink transfer printing device includes an ink container for retaining ink and a perforated ink transfer surface coupled to the ink container. The ink transfer surface includes at least one concentric region on the ink transfer surface about each of the perforations to control the spread of the ink. The concentric regions form flow barriers which impede the spread of the ink at each orifice. The ink dot size control provided by the present invention facilitates continuous toning, gray scale toning and multi-color printing.

18 Claims, 2 Drawing Sheets

INK DOT SIZE CONTROL FOR INK TRANSFER PRINTING

BACKGROUND OF THE INVENTION

1. Field of the Invention

The present invention relates to a method and apparatus for controlling the size of ink dots produced by a printing device and, more particularly, to a method and apparatus for controlling the spread of ink on an outer surface of an ink transfer printing device.

2. Description of the Related Art

Image quality can be improved not only by increasing resolution, but also by using halftone techniques. The information content of a halftone image goes beyond resolution and includes different dot sizes and maybe even different shapes of the ink dots. As an example, a 150 dot per inch (dpi) image with 16 dot sizes will have a quality comparable to a 600 dpi image having a single dot size.

Ink jet printers produce drops which are ejected from an orifice towards a printing media. Several techniques are known for controlling the volume of ink drops produced by an ink jet printer. For example, the volume of ink drops has been controlled in piezoelectric drop-on demand printers by varying pulse height or pulse width of the applied electrical energy. Each pulse of energy produces a single drop of ink. The volume of ink drops has also been controlled by ejecting a group of drops which merge together to form a larger drop. However, each individual drop ejected has a common volume which is determined by the orifice size.

The present invention relates to printing techniques in which ink flows onto an ink transfer surface through orifices (e.g., ink transfer printing). In contrast, ink jet printers spray or jet ink through nozzles towards a printing media. As a result, the ink drop volume control techniques used with ink jet printers are not suitable for controlling ink dot size in ink transfer printing devices. Hence, novel techniques for controlling ink dot size in ink transfer printing devices are needed.

Additional background information on known printing techniques is contained in "Computer Graphics—Technology and Applications," Vol. II— "Output Hardcopy Devices," by Robert C. Durbeck and Sol Sherr, San Diego 1988.

SUMMARY OF THE INVENTION

In the present invention, at least one concentric region is provided on the ink transfer surface about each of the perforations to control the spread of the ink. The concentric region is preferably either a wet ring or an etched ring.

An ink transfer printing device which uses one or more concentric regions about each perforation in its ink transfer surface will enjoy improved dot size control. Specifically, the concentric regions form flow barriers which impede the spread of the ink at each orifice. The improved dot size control provided by the present invention enables the printing device to improve print quality. Further, the printing device according to the present invention will be capable of improved continuous toning, gray scale toning and multicolor printing.

BRIEF DESCRIPTION OF THE DRAWINGS

The present invention will be readily understood by the following description in conjunction with the accompanying drawings, wherein like reference numerals designate like structural elements, and in which.

DETAILED DESCRIPTION OF THE PREFERRED EMBODIMENTS

Figure 1:
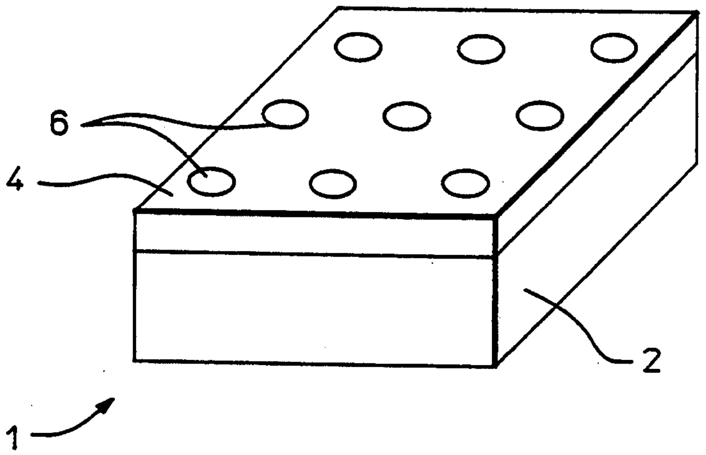
FIG. 1 is a three-dimensional diagram of an ink transfer device.
Figure 2:
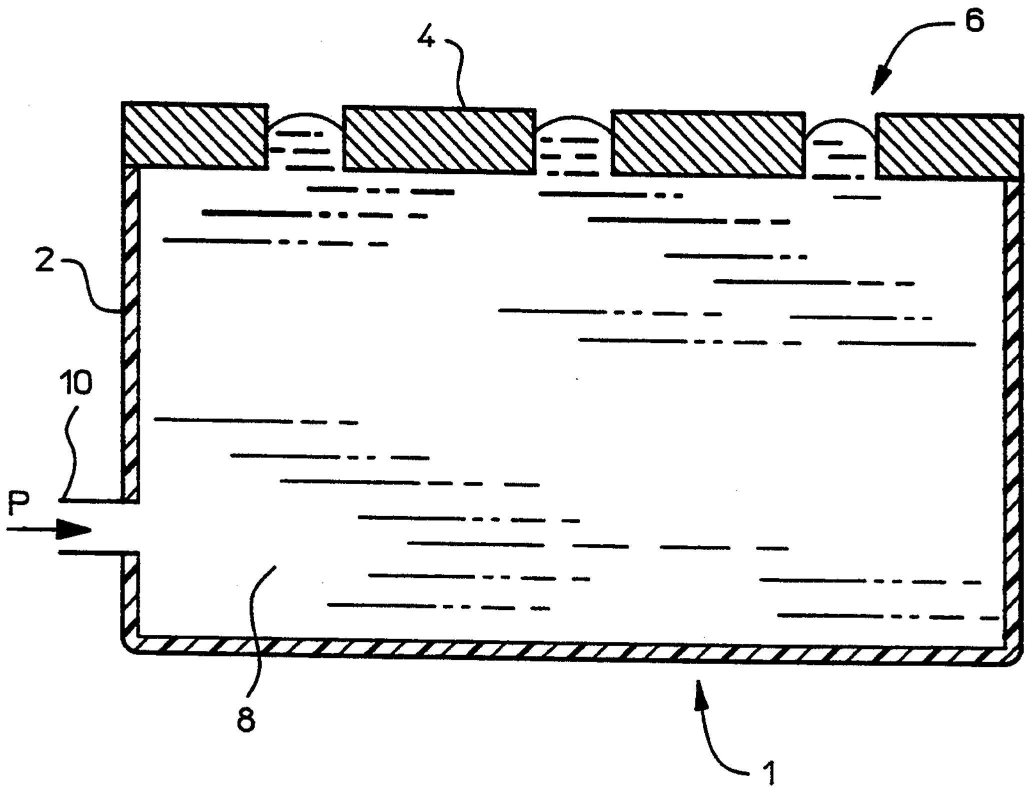
FIG. 2 is a cross-sectional diagram of the ink transfer device illustrated in FIG. 1.

FIG. 1 illustrates an ink transfer printing device 1, and FIG. 2 illustrates a cross-sectional view of the ink transfer device 1. The ink transfer device 1 includes an ink reservoir 2 and an ink transfer surface 4 having a plurality of orifices 6.

The ink transfer printing device 1 uses the viscosity of the ink to drive the ink transfer process. Ink 8 within the ink reservoir 2 is pressurized by a pressure inlet 10. Under ambient conditions, ink 8 held within the ink reservoir 2 has a viscosity which is high enough to prevent a small applied positive pressure from forcing the ink 8 onto the ink transfer surface 4. Thus, the viscosity of the ink 8 at ambient conditions prevents flow of ink through the orifices 6 and onto the ink transfer surface 4 (i.e., non-printing state). The ink transfer device 1 shown in FIG. 2 is in a non-printing state.

On the other hand, at operating conditions, the viscosity of the ink near certain orifices 6 is reduced. As a result, the ink near these certain orifices 6 flows through the corresponding orifices 6 and onto the ink transfer surface 4 to form ink dots (i.e., printing state). The ink dots formed are thereafter transferred to a printing media.

The present invention provides an improvement which may be used with an ink transfer printing device 1. Viscosity-driven ink transfer printing devices were fully described in U.S. application Ser. No. 07/983,007, entitled "Method and Apparatus for Ink Transfer Printing," filed concurrently herewith, as well as in EPO Patent Publication 00600712 A2, published Jun. 8, 1994, which is the EPO counterpart application of U.S. application Ser. No. 07/983,007, and both are hereby incorporated by reference.

To produce high quality printed images using an ink transfer printing device 1, the inventors have found it desirable to consistently control not only the volume of ink which flows from an orifice 6 onto the ink transfer surface 4, but also the spread of the ink which has flowed onto the ink transfer surface 4. The present invention relates to techniques for controlling the spread of ink dots on the ink transfer surface 4. By controlling the spread of the ink dots, images produced using continuous toning and multi-color printing will have excellent print quality.

The volume of ink which flows through an orifice 6 can be regulated by controlling the quantity and duration of applied viscosity-reducing energy. Basically, the more energy applied, the greater the volume of ink which flows. The viscosity-reducing energy is typically supplied by thermal, electrical or magnetic means. For example, in a thermally activated system, a light source or resistive heater element heats the ink near a particular orifice 6. To increase the volume of ink which flows through the particular orifice 6 and onto the ink transfer device 1, the pulse width, voltage and/or period may be increased. The result is an ink dot with a greater volume of ink.

When the volume of the ink dot is increased, the spread of the ink on the ink transfer surface 4 becomes more of a consideration. If the volume of ink within the ink dot is small, then the spread of the ink dot is not a major concern. However, as the volume of the ink dot is increased, the spread of the ink becomes more of a concern. The spread of the ink dot is particularly important when printing various sizes of dots to obtain continuous toning or when mixing various colors of ink for multicolor printing.

Furthermore, when printing in multiple colors, it is advantageous to control both the spread and volume of the ink at each orifice. Colored inks can be mixed in numerous ways when both the volume and spread are controlled. For example, if one had a color ink transfer printing device and wanted to print a magenta pixel with a red center, the following steps might occur. First, a large volume of magenta ink would be placed on the ink transfer surface via an orifice. The spread of the magenta ink would also be controlled to insure that the ink was uniformly spread a relatively large predetermined radius out from the orifice. The magenta ink dot would then be transferred to an intermediate surface or a printing media. Next, a small volume of yellow ink would be placed on the ink transfer surface. The spread of the yellow ink on the ink transfer surface would be controlled to insure that it spread only a relatively small predetermined radius out from the orifice. The small yellow dot would then be transferred to the intermediate surface or printing media at the center of the larger magenta dot. The yellow ink dot would then mix with the magenta ink so as to produce a red center in the magenta dot. Thereafter, the ink would be fixed to the printing media.

Thus, by controlling the spread of ink at each orifice 6 (so called "ink dot spread"), better and more visually appealing print quality can be obtained. Namely, continuous gray scale toning can be achieved by controlling the ink dot spread. In addition, in a color ink transfer printing device, various colored inks can be uniquely mixed by controlling both the volume and the ink dot spread for each color of ink.

Two embodiments for controlling ink dot spread are described below. A first embodiment provides rings of alternating wet and non-wet surfaces on an ink transfer surface 4. A second embodiment provides etched grooves in an ink transfer surface 4.

Figure 3:
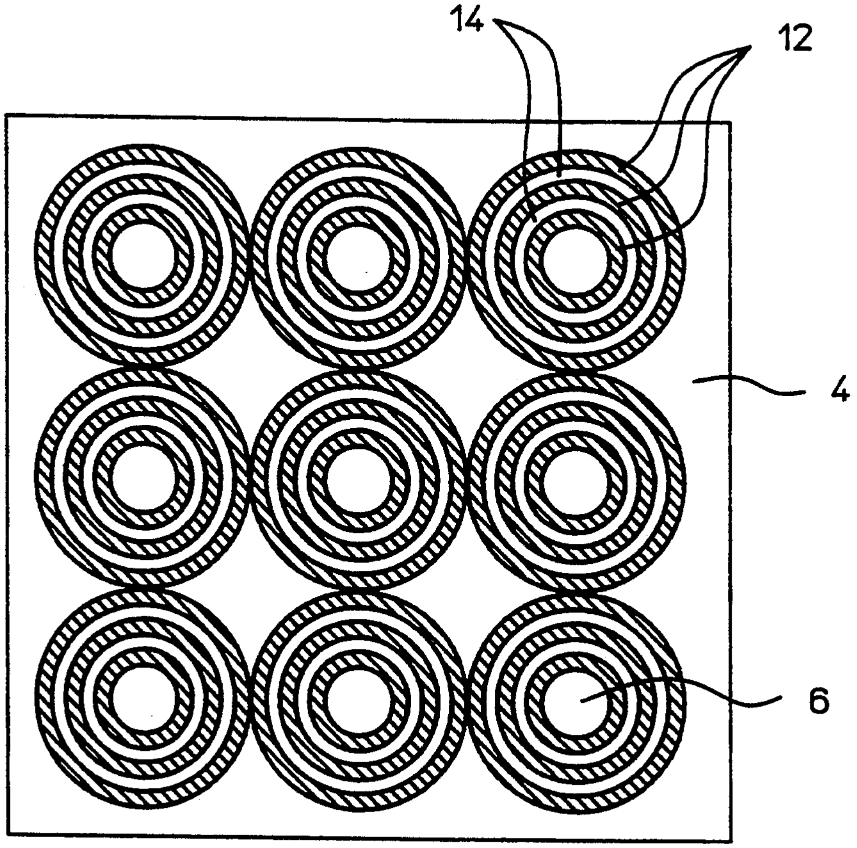
FIG. 3 is a detailed top view diagram of the ink transfer device illustrated in FIG. 1 showing concentric rings disposed about each orifice.

According to the first embodiment, alternating rings of wet and non-wet surfaces are provided around each orifice 6 of the ink transfer surface 4. FIG. 3 illustrates a top view of an ink transfer surface 4 according to a first embodiment. The ink transfer surface 4 shown in FIG. 3 contains nine orifices 6. The orifices 6 are 50 μm in diameter and spaced apart from each other by 100 μm center to center. Around each orifice 6 are three wet rings 12 and two non-wet rings 14. Each of the rings has a width of 5 μm. The number, size and shape of the rings shown in FIG. 3 are illustrative and not limitations on the invention. For example, the shape of the rings 12, 14 could be oval or square.

The wet and non-wet rings 12, 14 form flow barriers which impede the ink dot spread. Namely, at each transition from a wet ring 12 to a non-wet ring 14, the ink dot seeking to spread out from an orifice will encounter a flow barrier. The barrier results from the transition from a low surface tension region to a high surface tension region. The barrier impedes the ink dot spread until the volume of ink builds up to overcome the barrier.

One way to make the wet and non-wet rings 12, 14 is to coat the portion of the ink transfer surface 4 corresponding to certain rings with wetting or non-wetting materials. For example, the wet and non-wet rings can be made by applying a chemical coating to certain portions of the ink transfer surface 4. With respect to aqueous ink, examples of wetting chemicals are silicon dioxide and aluminum oxide. Examples of non-wetting chemicals are fluorocarbon compounds such as fluoraliphatic polymeric esters (e.g., FC-430 by 3M Company).

If the top surface of the outer ink transfer surface 4 is normally a non-wet surface such as fluorocarbon (e.g., TEFLON) for aqueous inks or polyimide (e.g., KAPTON produced by E. I. DuPont Company), a coating of a wetting chemical such as silicon dioxide may be deposited using a plasma enhanced chemical vapor deposition process to form wet rings 12. In particular, the wetting agent is deposited on concentric regions of the top surface about each of the orifices 6. The concentric regions of the wetting agent so deposited form the wet rings 12. Although the concentric regions have a common center, the concentric regions of the wetting agent which are deposited do not contact one another. That is, the concentric wet regions formed by the wetting agent are separated by concentric non-wet regions. Since the top surface is non-wet, no surface treatment is required to form the non-wet rings 14. Hence, the non-wet rings 14 are identified when the wet rings 12 are formed.

Another way to make the wet rings 12 is to modify concentric regions of the ink transfer surface 4. These surface modifications can be performed using conventional methods. One conventional method exposes the concentric regions of the ink transfer surface 4 to a gas plasma. For example, assuming the ink transfer surface 4 is a non-wet surface such as KAPTON, with the exception of the concentric regions of the ink transfer surface 4, the entire surface of the ink transfer surface 4 is shielded with a mask. The ink transfer surface 4 is then exposed to a gas plasma which changes the unmasked portion of the surface to wet rings 12. Examples of the gases which may be used are oxygen plasma, $CH_4/O_2$ plasma or ion implantation.

Figure 4:
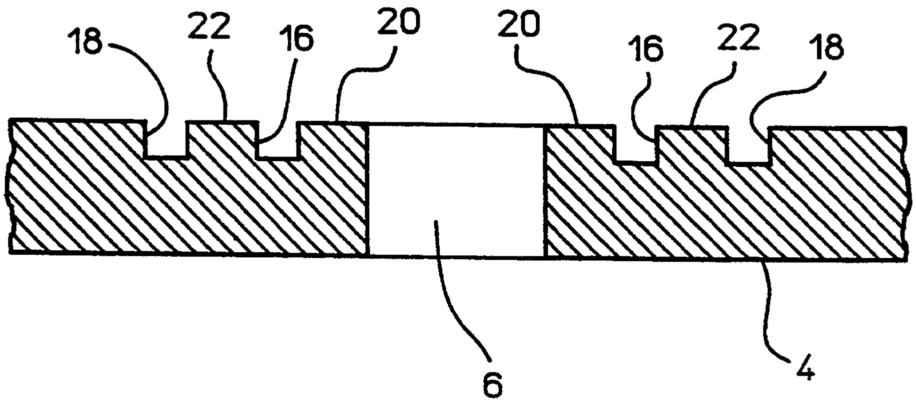
FIG. 4 is a detailed cross-sectional diagram of an orifice of the ink transfer device having etched rings.

According to the second embodiment, concentric regions are etched into the ink transfer surface 4. FIG. 4 illustrates a detailed cross-sectional view of an ink transfer surface 4 according to the second embodiment.

In FIG. 4, the concentric regions are etched rings 16, 18. The etched rings 16, 18 have a width of 1 μm and a depth less than 0.2 μm. The number, depth and width of the etched rings 16, 18 shown in FIG. 4 are illustrative and not limitations of the invention. The etched rings 16, 18 control the ink dot spread. Although the ink transfer surface 4 should be non-wet, the etched rings 16, 18 may be either wet or non-wet. The etched rings 16, 18 can be formed on the ink transfer surface 4 using conventional methods, such as reactive ion etching, ion beam milling or excimer laser ablation.

This embodiment restricts the ink dot spread using the non-wet surface of the ink transfer surface. Once the etched rings 16, 18 are formed, non-wet rings 20, 22 are identified. Due to the surface tension of the non-wet rings 20, 22, the ink flowing from an orifice 6 will not want to flow across non-wet rings 20, 22. However, as additional ink flows through the orifice 6, the volume of the ink increases and eventually the surface tension of the non-wet ring 20 is exceeded. Once the surface tension is exceeded, the ink will spread out to just before the next non-wet ring 22.

The etched rings 16, 18 provide an increased flow barrier to the spread of the ink dot. In particular, for the ink dot to spread out over the non-wet ring 22, the volume build up of ink must exceed the surface tension of the non-wet ring 22. At this non-wet ring 22, the surface tension seen by the ink dot is greater than the surface tension seen when the ink dot sought to spread out over the non-wet ring 20. Namely, the provision of the etched ring 16 just before the non-wet ring 22 enlarges the barrier which the ink dot must overcome to spread out to the next ring. Hence, a greater volume of ink build up will be required to overcome the barrier.

The etched rings 16, 18 may be etched using conventional methods. For example, the ink transfer surface 4 may be polyimide (e.g., KAPTON) which is non-wet with respect to aqueous ink. A mask pattern corresponding to the regions which are not to be etched is placed on the ink transfer surface 4. The etched rings 16, 18 are then etched in the ink transfer surface 4 by excimer laser ablation.

It may be advantageous to clean the ink transfer surface 4 after each use. In particular, after ink dots on the ink transfer surface 4 have been transferred to the intermediate surface or printing media, some residue may remain. The residue ink may be cleaned off using a doctor blade made of rubber or cloth. A doctor blade made of felt material or other cloth like material might be preferred in an embodiment which uses etched rings.

It may also be advantageous to combine the features of the first and second embodiments. For example, an ink transfer surface might use wet rings, non-wet rings and etched rings.

Accordingly, by controlling ink dot spread on the ink transfer surface 4, both of the embodiments of the present invention enable the ink transfer printing device 1 to obtain excellent print quality. In particular, the present invention facilitates improved continuous toning, gray scale toning and multicolor printing.

The many features and advantages of the present invention are apparent from the detailed description and thus it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. In an ink transfer printing device wherein ink is transferred from an ink reservoir to a printing media via an ink transfer surface having a plurality of orifices, wherein the improvement comprises forming a plurality of flow barriers on the ink transfer surface about each of the orifices to control the spread of the ink so as to produce ink dots of various sizes.

2. In an ink transfer printing device as recited in claim 1, wherein said flow barriers occur at the junction of a wet surface and a non-wet surface.

3. In an ink transfer printing device as recited in claim 1, wherein said flow barriers occur at the junction of an etched pattern and a non-wet surface.

4. An ink transfer printing device, comprising:
an ink container for retaining ink; and
an ink transfer surface, coupled to said ink container, having a plurality of perforations and a plurality of concentric regions on said ink transfer surface about each of the perforations to control the spread of the ink so as to produce ink dots of various sizes.

5. An ink transfer printing device as recited in claim 4, wherein said concentric regions form flow barriers about each of the perforations to impede the spread of the ink.

6. An ink transfer printing device as recited in claim 4, wherein at least one of said concentric regions comprises a wet ring.

7. An ink transfer printing device as recited in claim 4, wherein at least one of said concentric regions comprises a non-wet ring.

8. An ink transfer printing device as recited in claim 4, wherein said concentric regions are etched into said ink transfer surface.

9. An ink transfer printing device as recited in claim 8, wherein said concentric regions are etched rings.

10. An ink transfer printing device as recited in claim 4, wherein said ink transfer surface is planar.

11. An ink transfer printing device, comprising:
an ink container for retaining ink;
an ink transfer surface, coupled to said ink container, having a plurality of perforations and a plurality of concentric regions on said ink transfer surface about each of the perforations to control the spread of the ink, the viscosity of the ink under ambient conditions prevents flow of the ink through the perforations;
viscosity reduction means for inducing a change in the viscosity of the ink near certain of the perforations thereby enabling the ink near said certain of the perforations to flow through said certain of the perforations onto said ink transfer surface; and
ink transfer means for transferring the ink, which has flowed onto the ink transfer surface, to a printing media.

12. A method for controlling an ink transfer printing device to produce a printed image having continuous toning, the ink transfer printing device having an ink reservoir and an ink transfer surface with a plurality of orifices, said method comprising the steps of:
(a) flowing a predetermined volume of ink from the ink reservoir onto the ink transfer surface via a plurality of the orifices;
(b) producing ink dots of various sizes on the ink transfer surface by controlling the spread of the ink which has flowed onto the ink transtar surface via the plurality of orifices; and
(c) transferring the ink dots to a printing media to produce a printed image by contacting the printing media to the ink transfer surface.

13. A method for controlling an ink transfer printing device to produce a multicolor printed image, the ink transfer printing device having an ink reservoir retaining colored inks and an ink transfer surface with a plurality of orifices, said method comprising the steps of:
(a) flowing a predetermined volume of a first color of ink from the ink reservoir onto the ink transfer surface via each of a first plurality of the orifices;
(b) producing a first set of ink dots of various sizes on the ink transfer surface by controlling the spread of the ink which has flowed onto the ink transfer surface via the first plurality of orifices;

(c) flowing a predetermined volume of a second color of ink from the ink reservoir onto the ink transfer surface via each of a second plurality of the orifices;

(d) producing a second set of ink dots of various sizes on the ink transfer surface by controlling the spread of the ink which has flowed onto the ink transfer surface via the second plurality of orifices; and (e) transferring the first and second set of ink dots to a printing media to produce a multicolor printed image by contacting the printing media to the ink transfer surface.

14. A method as recited in claim 13, wherein said transferring step (e) comprises the step of (e1) mixing certain ink dots of the first set of ink dots with certain ink dots of the second set of ink dots.

15. A method as recited in claim 14, wherein said mixing step (e1) mixes unequal volumes of the certain ink dots of the first and second sets of ink dots to produce additional colors.

16. A method as recited in claim 15, wherein said mixing step (e1) mixes the certain ink dots of the first and second sets of ink dots having unequal spreads.

17. A method as recited in claim 14, wherein said transferring step (e) comprises the steps of:

(e1) transferring the first set of ink dots to an intermediate surface subsequent to step (b);

(e2) transferring the second set of ink dots to the intermediate surface subsequent to step (d); and (e3) transferring the first and second set of ink dots from the intermediate surface to the printing media.

18. A method as recited in claim 14, wherein said transferring step (e) comprises the steps of:

(e1) transferring the first set of ink dots to an intermediate surface subsequent to step (b);

(e2) transferring the second set of ink dots to the intermediate surface subsequent to step (d); and (e3) transferring the first and second sets of ink dots from the intermediate surface to the printing media.

* * * * *